R. SOMERS.
MUSIC CHART.
APPLICATION FILED JAN. 20, 1910.
1,091,598.
Patented Mar. 31, 1914.
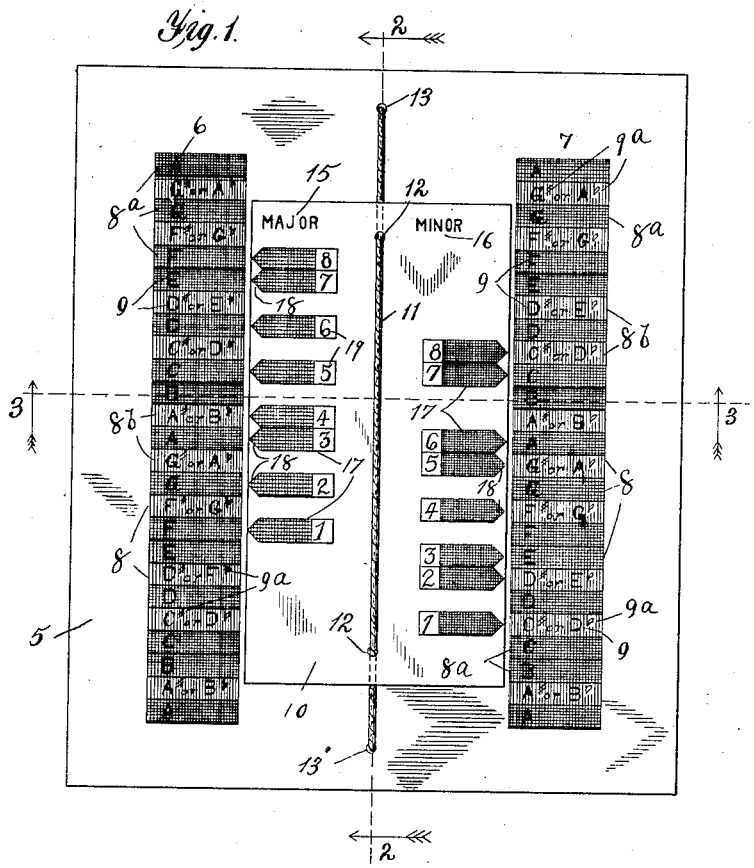
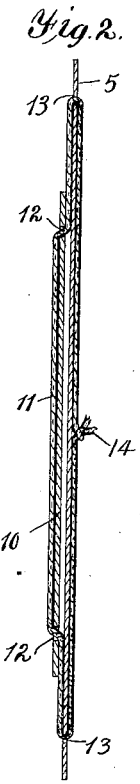
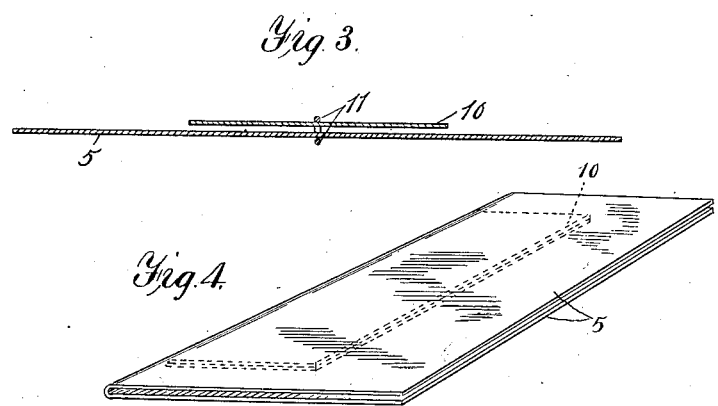
Witnesses
C. F. Barrett
M. A. Milord
Inventor
Roy Somers
By Frederick Benjamin
Attorney
COLUMBIA PLANOGRAPH CO., WASHINGTON, D. C.

UNITED STATES PATENT OFFICE.

ROY SOMERS, OF MUSKEGON, MICHIGAN.

MUSIC-CHART.

1,091,598.  Specification of Letters Patent.  Patented Mar. 31, 1914.

Application filed January 20, 1910. Serial No. 538,989.

*To all whom it may concern:*

Be it known that I, ROY SOMERS, citizen of the United States, residing at Muskegon, in the county of Muskegon and State of Michigan, have invented certain new and useful Improvements in Music-Charts, of which the following is a specification.

My invention relates to educational apparatus and has particular reference to devices designed to aid in the study of the musical scales.

The principal objects of the improvements which constitute the subject matter of this application for patent are, to graphically present the major and minor scales in such a manner that the relative arrangement of the intervals between the notes in the two scales will be quickly, clearly, and properly represented and the significance of the sharps and flats readily understood; to produce a device that may be utilized by the student in memorizing certain facts with respect to the various keys and to furnish a mechanical means that may be used to facilitate the transposition of a scale from one key to another.

Further objects of the invention, mentioned more in detail are, the provision of a mechanical contrivance for objectively demonstrating the relation of both major and minor keys to the key board simultaneously, the arrangement being such that the said scales are moved in unison; to furnish a simple apparatus of light weight and convenient to handle, and adapted to be folded to a size that will permit it to be conveniently placed in the pocket, and since it may be made of inexpensive materials the device can be cheaply manufactured and supplied to the user for a nominal price.

I accomplish the desired results by the employment of a device consisting of two superposed plates or cards, relatively slidable, one of said plates bearing duplicate conventional representations of a keyboard, and the other plate having arbitrary designs to graphically indicate the intervals of the major and minor scales, provision being made by a cord passing through holes in the cards or plates to connect them permanently together the said cord serving the double purpose of a guide upon which one plate slides and also a stop to limit the relative movement of the plates.

The preferred form of the device is disclosed in the accompanying drawing, which constitutes a part of this application, the details of construction being shown in the following views:—

Figure 1 is a plan view of the complete device; Figs. 2 and 3 are sectional views taken on the lines 2—2 and 3—3, respectively, of Fig. 1, and Fig. 4 is a perspective view of the device folded for the pocket.

Referring to the details of the drawing, the numeral 5 indicates a rectangular foundation plate or card, upon which are printed or otherwise impressed duplicate representations 67 of the key board of a pianoforte. These representations will hereinafter be termed the key-boards and consist of series of similar oblong rectangular divisions 8, arranged side by side. These divisions or keys are lettered as indicated at 9, to correspond with the usual arrangement of notes, and to properly attain the purposes in view, it is preferable to represent two octaves in each keyboard. The lowest key in each column or keyboard is designated A and the usual order of the ascending scale is maintained throughout each octave in the respective columns. The keyboard will thus begin and end with A and this will also be the middle key, all the other letters appearing twice in the column. As in the ordinary keyboard, I prefer to indicate the sharps and flats by distinguishing colors, which may be arbitrarily chosen. In the arrangement shown I have designated the natural notes by black keys $8^a$ and the sharps (or flats) by red keys $8^b$, the selected colors being shown by conventional shading, and to further distinguish the keys they are marked with their proper letters 9 accompanied by the signs in common use to designate sharps and flats, as indicated at $9^a$. Arranged between the vertical columns of keys is a smaller plate or slide 10, of such dimensions that its lateral margins will approximate the keyboards upon either hand. I prefer, for various reasons, to use ordinary card board for this plate as well as the foundation plate 5 which supports the former. The plate or card 10 is slidably mounted by means of a cord 11 which passes through holes 12 in the vertical median line, arranged near the upper and lower edges of the said card. The cord 11 is then passed through holes 13 arranged in the median line of the foundation plate 5 and after being drawn fairly taut the ends of the cord are secured in any convenient manner to the back of the main or foundation plate, or simply fastened together by knotting, as shown at 14.

Near the lateral margins of the slide plate 10 are arranged graphic representations of the major and minor scales the names of the scales being placed above as shown at 15, 16. The notes in each scale are arbitrarily designated by oblong horizontal divisions or graduations 17 similar in outline to the keys 8, but having the ends 18 which are directed toward the adjacent column made angular forming pointers or indexes to clearly indicate the particular keys 8 with which they aline when the slide 10 is shifted. I prefer to designate the graduations 17 representing the notes of the scales by number, the corresponding figures 19 being conveniently placed opposite the inner ends of the graduations 17. The said graduations are spaced apart to graphically represent the harmonic intervals properly belonging to each respective scale. Thus in the major scale the 3rd and 4th divisions and also the 7th and 8th are in juxtaposition indicating the half tone or interval, while the wider spaces between the remaining notes of the scale plainly show that the intervals are whole tones. Inspection of the minor scale will readily show that the intervals are changed, the half notes occurring between the 2nd and 3rd, the 5th and 6th, and the 7th and 8th. Thus the observer will perceive at a glance the relative arrangement of the scales without moving the plates or cards.

To demonstrate the relation of the two scales to the musical notes as represented in the keyboards, the guiding card 10 is moved by sliding it up or down until the note 1 of one or the other of the scales is opposite the key selected as the base. Thus in the drawing the index or division 1 of the major scales points to the key F, and the remaining divisions indicate in sequence the keys G, A, Bb C. D. E. F, showing at a glance that there is one flat in the key of F major, and enabling the novice to locate it readily. Again transposing by bringing the note 1, to a position opposite the key C, the notes of the major scale will coincide with the keys C, D, E, F, G, A, B, C, and as the indicated keys are all black, since there are no sharps or flats, it necessarily follows that the scale of C major is the natural scale. The transposition of the minor scale is accomplished in precisely the same manner and will be clearly understood from the preceding description of the variations in the major scale.

The travel of the slidable card 10 is equal to the difference between the spacing of the holes 12 and 13 in the respective cards, for as soon as either of the holes 12 reaches the point where the guide cord passes through the underlying plates it can go no farther. The object of thus limiting the relative movement of the cards is to prevent confusion in the mind of the observer, which might arise if it were possible to carry the index note 1 of either scale beyond a single octave, reckoning from the lowest key with which it may be made to correspond. In the device illustrated the limitations are such that the note 1 of the major scale can travel from the lower C to the key B, designated a and b respectively; while the index note 1 of the minor scale has an excursion limited by the keys A and G sharp in the corresponding keyboard, said keys being indicated respectively by the reference characters c and d.

It will be evident that the keyboards may be extended to cover any number of octaves, but as all the principles which can be demonstrated in the extended keyboard are present in the one of two octaves, and the dimensions of the latter are more convenient for the hand, for this and other reasons the arrangement shown is to be preferred.

As the preferred material entering into the construction of the plates of the device is heavy paper or card board, the plates may be reduced to a more compact form by folding them along the median line, indicated in Fig. 1 by the dotted section line 2—2 and when thus folded, in the manner shown in Fig. 4, the device may be conveniently placed in the pocket.

Having thus described my invention what I claim as new, is:—

A music chart comprising diagrams of piano key boards, said diagrams disposed parallel with each other and having the notes of the major and minor scales indicated respectively thereon, a piece movable longitudinally between and parallel to said diagrams and containing on one side of the longitudinal center of said piece diagrams indicating the major scale and on the opposite side diagrams indicating the minor scale, said major and minor scale diagrams drawn proportionately to the fixed diagram so that when the major scale is adjusted to a certain key, the scale diagram on the other side will indicate the notes of the relative minor scale.

In testimony whereof I affix my signature in the presence of two witnesses.

ROY SOMERS.

Witnesses:
L. O. GORDON,
BENJ. H. TELLMAN.

---

Copies of this patent may be obtained for five cents each, by addressing the "Commissioner of Patents, Washington, D. C."